R. O. JUNEK.
SAFETY HITCH.
APPLICATION FILED OCT. 4, 1919.

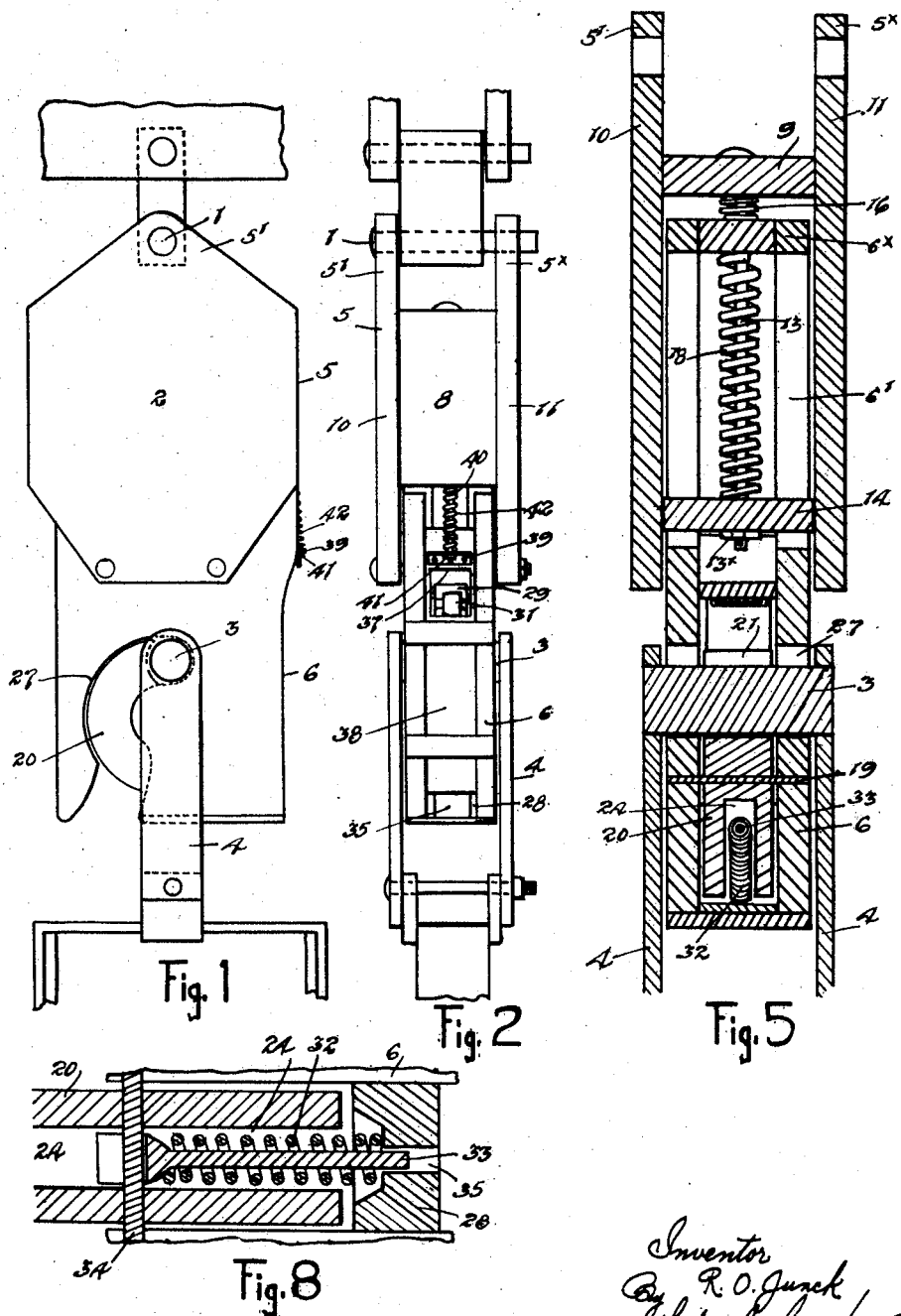

1,344,899.

Patented June 29, 1920.
2 SHEETS—SHEET 2.

Inventor
R. O. Junek.
By Fetherstonhaugh
Attys.

UNITED STATES PATENT OFFICE.

RUDOLPH O. JUNEK, OF ESTERHAZY, SASKATCHEWAN, CANADA.

SAFETY-HITCH.

1,344,899.  Specification of Letters Patent.  Patented June 29, 1920.

Application filed October 4, 1919. Serial No. 328,574.

*To all whom it may concern:*

Be it known that I, RUDOLPH O. JUNEK, of the town of Esterhazy, in the Province of Saskatchewan, Canada, have invented certain new and useful Improvements in Safety-Hitches, of which the following is the specification.

The invention relates to improvements in safety hitches particularly adapted for hitching the various types of agricultural implements to tractors and the principal object of the invention is to provide a hitch which can be set to release at a predetermined instant, dependent on the pull and which is also arranged so that the tractor and implement can be quickly and easily re-connected after the hitch has been undone.

A further object is to construct the device so that it can be adjusted to withstand various pulls thereby making it possible to accommodate the hitch to the load.

A further object is to construct the hitch in a simple manner so that it can be readily set up and such that it can be absolutely relied upon when in use.

With the above more important objects in view the invention consists essentially in the arrangement and construction of parts hereinafter more particularly described and later pointed out in the appended claims, reference being had to the accompanying drawings in which:—

Figure 1 is a plan view of the hitch.

Fig. 2 is a side view thereof.

Fig. 5 is a longitudinal sectional view through the hitch, the section being taken at Z—Z' Fig. 3.

Fig. 8 is a longitudinal sectional view through the disk spring and associated parts.

In the drawings like characters of reference indicate corresponding parts in the several figures.

Figure 3:
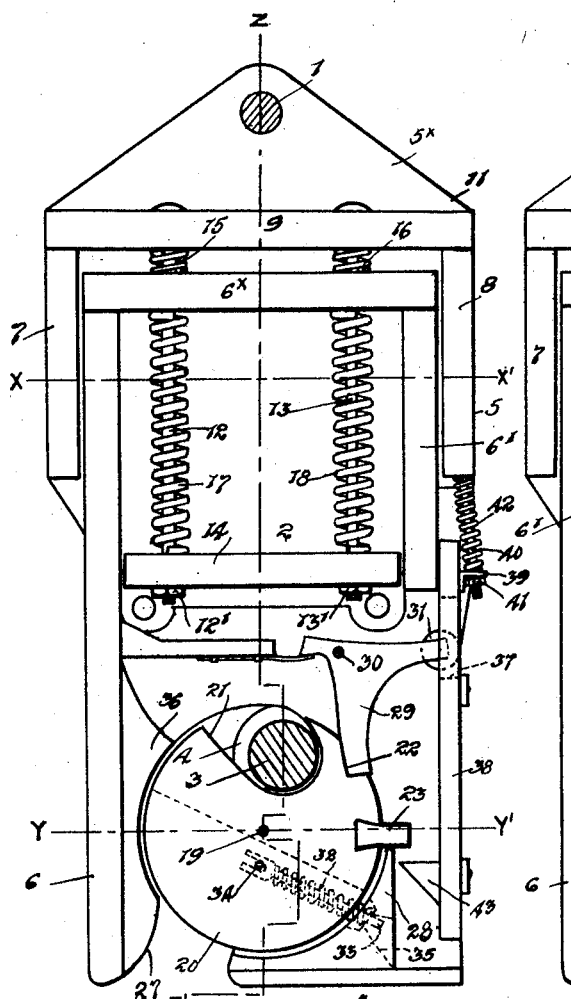
Fig. 3 is an enlarged plan view with the top plates removed and with the clevis in the position it occupies when pulling the load.

This appliance as already intimated is used particularly for connecting tractors to agricultural implements and in the present instance for purposes of explanation it is assumed that the tractor draw bar is connected by the pin 1 to the front end of the hitch 2 while the agricultural implement such as a plow is connected by means of the pin 3 of the clevis 4 to the rear end of the hitch. The safety hitch comprises a front stationary box like casing 5 having the rear end open and a rear movable casing 6, the front end of which enters the casing 5 and operates against springs contained therein.

The front casing comprises side walls 7 and 8 and a front wall 9, these being positioned between top and bottom plates 10 and 11 suitably connected to the side walls and extended forwardly to provide top and bottom wings 5' and 5ˣ which receive the pin 1.

The forward end of the casing 6 is in the nature of an open centered substantially rectangular extension 6', the extension being slidably received within the casing 5 and having the front cross member 6ˣ thereof bored to receive a pair of bolts 12 and 13 which extend rearwardly from the front end 9 of the casing 5 and have their rear ends passing through an anchor bar 14 held in place on the bolts by end nuts 12' and 13' applied on the bolts. Comparatively light cushioning springs 15 and 16 are placed on the bolts or rods between the front members 6ˣ and 9 and comparatively heavy compression springs 17 and 18 are placed on the rods between the members 6ˣ and the anchor bar 14. These springs operate to hold the rear casing ahead or such that it takes normally the position as shown in the drawings.

Obviously one can draw the rear casing backwardly in respect to the front casing, the springs 17 and 18 resisting such movement. The rear casing 6 carries a vertically disposed center pin 19 on which I mount rotatably a controlling coupling disk 20 which is provided with a side slot 21, a right angled peripheral notch 22 adjacent the slot and an outstanding radially disposed stationary dog 23 and is interiorly cut away at the side remote from the slot to provide an operating clearance space 24 for a controlling spring later described.

Figure 4:
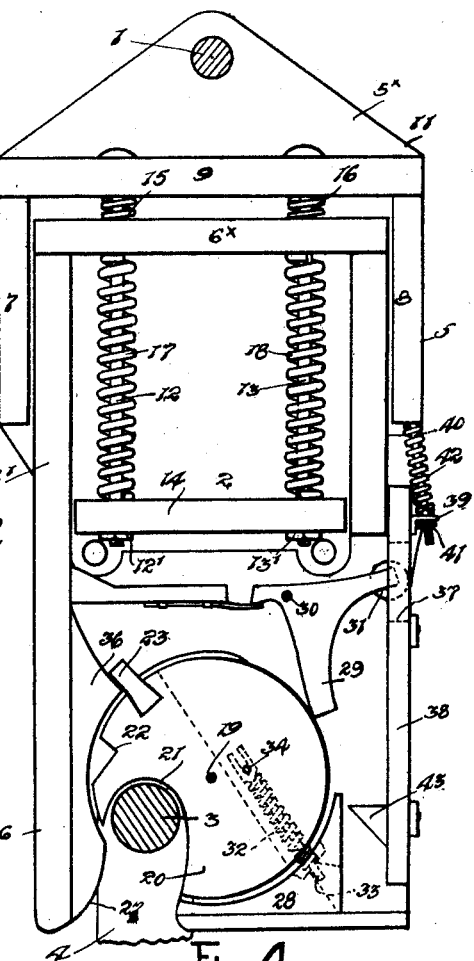
Fig. 4 is a view similar to Fig. 3 with the clevis released and about to pull out.
Figure 6:
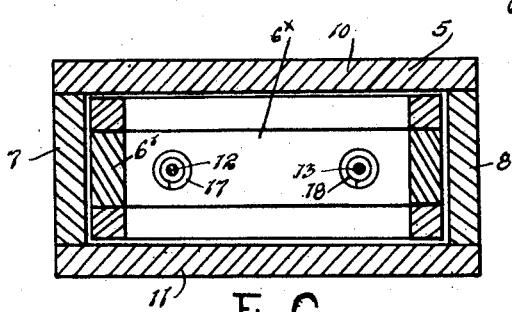
Fig. 6 is a cross sectional view at X—X' Fig. 3.
Figure 7:
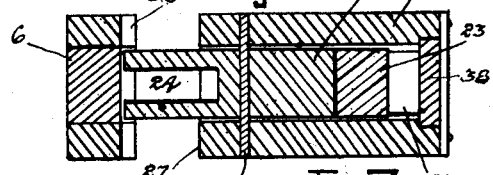
Fig. 7 is a cross sectional view at Y—Y' Fig. 3.

The rear end and the top and bottom plates of the rear casing 6 are constructed to provide admission slots 27 to permit the pin 3 to enter the slot 21 in the disk and to turn with the disk from the position shown in Fig. 4 to the position shown in Fig. 3 which is the final working position of the said pin. Here it is to be noticed that in the final working position the pin 3 is in advance and slightly to the side of the pin 19 and engaging the ends of the admission slots 27.

In the inner position of the pin 3 the disk is locked against turning farther in a clockwise direction by the dog 23 engaging a stationary stop 28 carried by the rear casing and is prevented from turning in a counter-clockwise direction by the locking action of a spring pressed dog 29 pivotally mounted on a carrying pin 30 and provided with an outwardly extending arm fitted with a roller 31. The clearance space 24 herein before mentioned contains a coiled spring 32 mounted on a rod 33, the inner end of the rod being pivotally carried by a pin 34 extending through the disk, while the outer end enters an opening 35 formed in the stop 28. The inner end of the spring seats against the inner head like end of the rod 33 while the outer end of the spring seats on the inner face of the stop. According to this arrangement it will be apparent that when the disk is in the position shown in Fig. 3 the spring 32 acts to hold the dog 23 engaged with the stop and acts to resist the turning of the disk in a counter-clockwise direction until such time that the center pin 19, the pin 34 and the opening 35 are alined, after which time it aids in the turning of the disk in the aforesaid direction. The turning of the disk in the counter-clockwise direction is stopped by the dog 23 engaging a fixed stop 36 within the rear casing, this occurring when the slot 21 has been turned to the rear to allow the pin 3 to escape.

The dog 29 is controlled by the action of the roller 31 operating in a slot 37 provided in a controlling bar 38 slidably mounted in the side of the casing 6 and having the inner end fitted with an angle plate 39 which receives slidably the rear end of an adjusting rod 40, the forward end of which is anchored to the side wall 8 of the casing 5 and the rear end of which is screw threaded and fitted with an adjusting nut 41. A compression spring 42 is mounted on the rod which acts normally to hold the bar 38 in its rear position, that is with the angle plate 39 engaging the nut. The rear end of the bar 38 is supplied with a catch 43 designed to engage the dog 23 in the movement of the bar.

The above completes the description of the parts but in order to better understand the invention I will now describe the manner in which it operates assuming that the pin 3 of the clevis is in the position shown in Figs. 1 and 3 of the drawings and that the hitch is pulling a load such as an agricultural implement hitched to the clevis.

Further, it will be assumed that the adjusting nut 41 has been set to accommodate the load for normal working conditions and that the springs 17 and 18 are sufficiently strong to carry the load.

The forward casing of the hitch which is connected directly to the draw bar of the tractor remains stationary while the rear part fluctuates slightly, moving back under the load as accommodated by the springs 17 and 18. In this normal free working movement there is no action in the bar 38 as it will be seen in Fig. 3 that the roller 31 is clear of the back end of the slot 37 while the catch 43 is clear of the dog 23. Consequently the disk is positively locked against rotary action by the dogs 23 and 29. Should however, the pull become excessive or greater than as provided for in the adjustment, the rear casing in traveling rearwardly brings the roller 31 into engagement with the rear end of the slot 37 and in the continued movement of the rear frame effects the swinging of the dog 29 in a direction which clears it from the notch 22 and coincident with the clearing of said dog from the notch the catch 43 catches the dog 23 and in the continued movement of the casing the catch 43 turns the dog and consequently the disk until the pin 3 has been forced slightly to the left from the position it occupies in Fig. 3 at which time the pull on the pin causes the disk to turn around in a counter-clockwise direction until stopped by the dog 23 engaging the stop 36 at which time the pin is free to clear out and release the hitch in which position it appears in Fig. 4. In this position the load has been unhitched and the disk is held against movement by the action of the spring 32 which at such time is operating to hold the dog 23 engaged with the stop 36. The instant the load is released the rear casing returns to its original position as does also the bar 38 although the dog 29 is riding the face of the disk.

In the released position of the clevis pin the disk is, as already stated, held against movement by the action of the spring 32. This is an important feature as it maintains the disk in a proper position to allow of the quick and easy reëntry of the pin when one desires to rehitch.

The releasing or unlocking of the disk is directly controlled by the setting of the nut 41 as it will be apparent that the position of the slot 37 in respect to the roller 31 controls the time at which the dog 29 is tripped.

If one wishes a comparatively quick release he screws the nut 41 well in in order to bring the roller quite close to the outer end of the slot 37 so that very shortly after the casing 6 starts to move the roller will hit the end of the slot and release the dog. If a later release is required the end of the slot is farther removed from the roller by screwing the nut toward the end of the rod 40.

When one re-hitches the tractor is backed and the pin 3 is entered into the location as shown in Fig. 4. As the hitch is moved farther back the pin carries the disk around with it until it resumes the original position as shown in Fig. 3 in which position it becomes again automatically locked, the dog 23 initially passing the dog 29 and finally striking the stop 28 at the same time that the dog 29 reënters the notch 22. The return of the disk to the locked position is facilitated by the action of the spring 32.

While I have entered into a detailed description of the various parts I wish it to be understood that the details thereof could be readily modified without in the least departing from the spirit of the invention as set forth in the accompanying claims.

If one at any time wishes to unhitch a load he simply pulls forwardly on the bar 38 to cause it to trip the dog 29 and release the disk. The bar can be readily pushed forward against the action of the spring 42 in order to allow the said dog to be tripped. A pulling ring, push pin, pulling chain or line (not shown) can be fastened to the bar for convenience in operating as above described.

What I claim as my invention is:—

1. A safety hitch comprising a stationary front casing, a forwardly and rearwardly movable rear casing associated with the front casing and extending rearwardly there-beyond, load carrying compression springs inserted between the casings and normally resisting the rear movement of the rear casing, a normally locked rotary load pulling disk carried by the rear end of the rear casing and adjustable means actuated by the back movement of the rear casing designed to unlock the disk to release the load upon a predetermined compression being built up in the springs.

2. A safety hitch comprising a stationary front casing, a forwardly and rearwardly movable rear casing associated with the front casing and extending rearwardly there-beyond, load carrying compression springs inserted between the casings and normally resisting the rear movement of the rear casing, a rotatable load pulling disk mounted in the rear end of the rear casing, releasable means normally locking the disk against movement and in the load pulling position and means for releasing the said latter locking means, said releasing means being actuated by the back movement of the rear casing and designed to act upon a predetermined pressure being built up in the springs.

3. A safety hitch comprising a stationary front casing, a forwardly and rearwardly movable rear casing associated with the front casing and extending rearwardly there-beyond, load carrying compression springs inserted between the casings and normally resisting the rear movement of the rear casing, a load pulling disk rotatably mounted in the rear end of the rear casing, said disk being provided with a peripheral slot for load hitching purposes and with a side notch for locking purposes, a spring pressed dog normally engaging the notch and locking the disk against rotary movement and in the load pulling position and means actuated by the back movement of the rear casing under the load adapted to release the dog upon a predetermined pressure being built up in the springs.

4. A safety hitch comprising a stationary front casing, a forwardly and rearwardly movable rear casing associated with the front casing and extending rearwardly there-beyond, load carrying compression springs inserted between the casings and normally resisting the rear movement of the rear casing, a load pulling disk rotatably mounted in the rear end of the rear casing, said disk being provided with a peripheral slot for load hitching purposes and with a side notch for locking purposes, a spring pressed dog normally engaging the notch and locking the disk against rotary movement, said dog being supplied with an extending arm, a controlling bar slidably carried by the rear casing and provided with a slot receiving the arm, an angle plate secured to the bar, an adjusting bolt having the front end anchored to the front casing and the rear slidably mounted in the plate, a spring interposed between the plate and the front casing and an adjusting nut on the bolt to the rear of the plate.

5. In a safety hitch, the combination with a stationary front casing and a forwardly and rearwardly movable rear casing associated with the front casing and load carrying compression springs interposed between the casings and normally resisting the rearward movement of the rear casing, of a disk pivotally mounted in the rear casing and provided with a peripheral hitching slot and a locking notch, a hitching load pulling pin normally entered in the slot, releasable means engaging the notch and normally locking the disk against movement in the load pulling position with the pin positioned in advance of the disk pivot point and means for releasing the locking means to release the disk and free the pin upon a predetermined compression being built up in the springs.

6. In a safety hitch, the combination with a stationary front casing and a forwardly and rearwardly movable rear casing associated with the front casing and load carrying compression springs interposed between the casings and normally resisting the rearward movement of the rear casing, of a pivotally mounted coupling disk carried by the rear end of the rear frame, said disk being provided with a peripheral slot, a load pulling pin normally entered in the slot, means for normally locking the disk against movement when the slot with the entered pin is in advance of the pivot point of the disk and in the normal advanced position of the rear frame and means for releasing the disk to rotate and free the pin upon a predetermined compression being built up in the springs.

7. In a safety hitch, the combination with a stationary front casing and a forwardly and rearwardly movable rear casing associated with the front casing and load carrying compression springs interposed between the casings and normally resisting the rearward movement of the rear casing, of a pivotally mounted coupling disk carried by the rear end of the rear frame, said disk being provided with a peripheral slot, a load pulling pin normally entered in the slot, means for normally locking the disk against movement when the slot with the entered pin is in advance of the pivot point of the disk and in the normal advanced position of the rear frame, means for releasing the disk to rotate and free the pin upon a predetermined compression being built up in the springs and spring means for holding the disk in a pin re-setting position after the pin has been released.

RUDOLPH O. JUNEK.

Witnesses:
A. N. GRANT,
F. S. CLEMENTS.